UNITED STATES PATENT OFFICE.

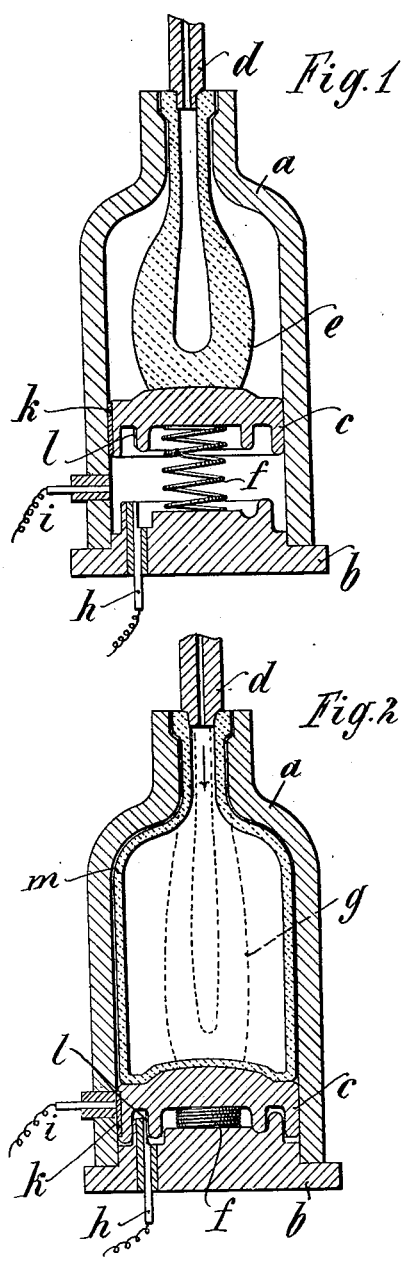

HEINRICH WILHELM HEERDT, OF AUSSIG, AUSTRIA-HUNGARY.

GLASS-MOLD.

SPECIFICATION forming part of Letters Patent No. 656,189, dated August 21, 1900.

Application filed March 21, 1900. Serial No. 9,622. (No model.)

*To all whom it may concern:*

Be it known that I, HEINRICH WILHELM HEERDT, a citizen of the Empire of Austria-Hungary, and a resident of Aussig, Austria-Hungary, (whose post-office address is Prodlitzerstrasse No. 911, Aussig,) have invented certain new and useful Improvements in Glass-Molds, of which the following is a specification.

To produce glass bottles with sides and bottoms of uniform thickness, such as are alone marketable, long experience on the part of the glass-blower is required. Still more difficult is it to achieve this when manufacturing bottles by machinery, a practice which is continually extending. Before the ball or the lump of glass picked up with the blowpipe and blown and worked into pear shape is blown into the mold in which the bottle is formed it has by means of suitable manipulation and by the aid of the weight of its lower part to be given the length which the finished bottle is to have. Accordingly the glass-maker does not blow until the ball has touched the bottom of the mold; but it is not possible to wait until this moment to close the mold, as otherwise the ball would have time to elongate too much. As it is not possible when the mold is closed to observe from the outside the moment when the ball has extended to the whole length of the mold, it is necessary that the moment in which this occurs should be indicated by some other means.

The present invention relates to an improved glass-mold in which this object is attained.

Figure 1 of the annexed drawings shows a vertical cut through the mold, the glass bulb having just been introduced, while Fig. 2 shows the same with the ready-blown bottle.

In the annexed drawings the mold $a$ has two bottoms, of which the lower one $b$ forms the foot of the mold, while the upper one $c$ is movable and forms the actual bottom of the mold. The upper bottom $c$ rests upon the lower one $b$ by means of a spiral spring, and its position before the glass ball is introduced is as represented in Fig. 1. On the ball $e$, hanging to the pipe $d$, being introduced into the mold and the latter being closed around the bottom the ball $e$ will by its own weight, before air is blown, in elongate itself, so as to press down the bottom $c$ and compress the spiral spring $f$. If the spring $f$ is of the correct strength, the bottom $c$ will descend slowly until it touches the bottom $b$. The position then is shown in Fig. 2, the dotted lines $g$ indicating the shape of the ball at this stage of the process. In the lower bottom $b$ is an insulated electrical contact $h$, and close to the bottom $b$ in the side of the mold is another insulated electrical contact $i$. In the descent of the upper bottom $c$ its part $k$ touches the contact $i$, and when the bottom $b$ has been reached the part $l$ of bottom $c$ touches the contact $h$ and closes an electrical circuit, which operates an alarm-bell or such like, which indicates that the moment has arrived for blowing, or in the case of glass-blowing machines, for which the present apparatus is principally intended, the electrical current operates the valve of the compressed-air pipe, and thus allows air to enter through pipe $d$ and blow out the ball, forming the latter into a bottle. The air-valve is then closed by hand or by any other means.

The arrangement by which the electrical current is switched on and by which the said current operates the compressed-air valve may take any desired form, and various modifications may be made in the arrangement of the contact between the upper and lower bottoms.

The employment of this improved mold is not restricted to the manufacture of bottles, since the apparatus is suitable for use in the manufacture of all kinds of hollow articles of glass.

What I claim is—

1. The combination with a glass-mold of means for automatically closing an electric circuit by aid of the weight of the glass, substantially as shown and described.

2. The combination with a glass-mold of a spiral spring fastened on top of the bottom and a false bottom borne by said spring, electrically-insulated contacts being disposed in the wall and in the bottom, substantially as shown and described.

In testimony whereof I affix my signature in presence of two witnesses.

HEINRICH WILHELM HEERDT.

Witnesses:
  BERTHOLD EISNER,
  ADOLPH FISCHER.